United States Patent [19]

Turpin

[11] 4,255,558

[45] Mar. 10, 1981

[54] SELF-CURING THERMOSETTING POWDER PAINTS

[75] Inventor: Edward T. Turpin, Elyria, Ohio

[73] Assignee: SCM Corporation, New York, N.Y.

[21] Appl. No.: 49,219

[22] Filed: Jun. 18, 1979

[51] Int. Cl.³ .............................................. C08L 61/26
[52] U.S. Cl. ...................... 528/245; 427/195;
427/388.3; 528/242; 528/243; 528/248; 528/266
[58] Field of Search ............ 427/195, 180, 374 R, 427/374 C, 375, 379, 384, 385 R, 386, 388 B, 27, 388 R; 528/256, 245, 269, 262, 266, 248, 242, 243; 428/524; 525/157, 162, 443, 515

[56] References Cited

U.S. PATENT DOCUMENTS

| | | | |
|---|---|---|---|
| 3,883,462 | 5/1975 | Pearson | 528/262 X |
| 3,959,405 | 5/1976 | Labana et al. | 427/195 X |
| 3,960,983 | 6/1976 | Blank | 427/388 B X |
| 3,980,733 | 9/1976 | Isaksen et al. | 427/195 X |
| 4,039,496 | 8/1977 | Hermann | 528/232 X |
| 4,064,191 | 12/1977 | Parekh | 525/186 |
| 4,118,437 | 10/1978 | Parekh | 525/162 |
| 4,138,528 | 2/1979 | Hahn et al. | 428/482 |

Primary Examiner—Ronald H. Smith
Assistant Examiner—Thurman K. Page
Attorney, Agent, or Firm—Thomas M. Schmitz

[57] ABSTRACT

The invention pertains to thermosetting powder paint compositions adapted to fuse and thermoset upon exposure to heat. The powder paint is based upon a one-component, self-curing polymeric binder comprising a thermosetting glycoluril copolymer containing methylol or alkoxy methyl glycoluril groups adapted to cross-link with reactive hydroxyl, carboxyl, or amide groups on the copolymer. The copolymer is produced by partial condensation of tetramethylol or tetra-alkoxy methyl glycoluril with units containing reactive hydroxyls, carboxyls, or amide groups.

9 Claims, No Drawings

SELF-CURING THERMOSETTING POWDER PAINTS

BACKGROUND OF THE INVENTION

This invention relates to improved thermosetting powder paints and more particularly pertains to single component polymeric glycoluril prepolymers adapted to be self cross-linking with reactive hydroxyl, carboxyl, or amide groups on the same polymer upon exposure to heat; and further relates to concurrently, commonly assigned U.S. Ser. No. 49,220 pertaining to two-component thermosetting powder paints based on a polymeric glycoluril cross-linking component.

Powder paints are ordinarily manufactured from raw batch ingredients comprising resinous binders, opacifying and filler pigmentary solids, plasticizers, and other additives to provide opacity, good film properties, and adhesion to substrates. The raw batch ingredients are uniformly mixed, formed into coherent extrudate by hot extrusion, and then comminuted to form small particle powder paints which are ordinarily free flowing at normal room temperature. Powder paints usually are uniform small powders passing 325 mesh or less than about 44 microns. Powder paints contain little or no fugitive solvents and depend upon their own inherent characteristics of the powder to melt, level, coalesce, and fuse to form an attractive coherent film on the substrate. The powder must not fuse in the container and cannot be subjected to cold flow so as to maintain individual powder particles prior to use. Recently issued U.S. Pat. No. 4,118,437 and U.S. Pat. No. 4,064,191 disclose thermosetting powder coatings wherein the cross-linking component is an alkylated glycoluril derivative.

Thermosetting powder paints are particularly suitable for use in commercial industrial process particularly since powder paints are essentially free of organic solvents. Prior art powder coatings ordinarily are based on two-component systems wherein the two components are adapted to coreact upon exposure to heat. Two-component systems, however, have inherent deficiencies such as reproducibility problems and quality control problems due to homogenization of dissimilar materials, incompatibility of two components causing curing and film surface problems, difficulty in controlling tack temperatures and/or melt temperatures and often undesirably depressed due to mixing two solid materials as well as higher cost, inconvenience, higher risk and other errors related to mixing two dissimilar materials wherein one of the materials is a monomeric or other low molecular weight material. Present commercial powder coatings often exhibit poor weathering properties. These disadvantages are avoided and many other advantages can be achieved by the one-component self-curing power coating composition of this invention.

It now has been found that a single component self-curing matrix polymer binder of this invention advantageously avoids problems inherent in two-component systems and provides an efficient powder coating adapted to fuse and cure into a continuous surface film exhibiting excellent film integrity properties. The self-curing single component matrix polymer is a moderately low molecular weight polymer synthesized by acid catalyzed condensation of a tetra-alkoxy methyl and/or tetramethylol glycoluril with a poly hydroxy material. The methylol and/or alkoxy methyl groups are coreactive with preferably hydroxyl groups upon exposure to curing temperatures to provide a cross-linked thermoset cured powder coating. The merits and advantages of this invention will become more apparent from the Detailed Description of the Invention.

SUMMARY OF THE INVENTION

Briefly, the invention pertains to thermosetting powder coatings based on a self-curing matrix binder comprising glycoluril copolymer containing methylol and/or alkoxy groups adapted to cross-link with coreactive hydroxyl, carboxyl, or amide groups. The glycoluril copolymer is produced by an acid catalyzed reaction of tetramethylol and/or tetra-alkoxy methyl glycoluril partially condensed with a poly-hydroxy material whereby the self-curing copolymer contains both methylol or alkoxy groups for cross-linking preferably with reactive hydroxyls or alternatively with reactive carboxyls or amides.

DETAILED DESCRIPTION OF THE INVENTION

The powder paint of this invention is primarily based on a single-component, self-curing glycoluril polymer by partial condensation of tetramethylol and/or tetra-alkoxy methyl glycoluril preferably with a poly-hydroxy (or carboxyl, or amide) material on a weight proportion to provide broadly a ratio of ½ to 2/1 equivalents of reactive glycoluril functions to reactive hydroxyls (or carboxyls or amides). An approximate 1/1 equivalent ratio of methylol and/or alkoxy methyl groups to reactive hydroxyl groups is preferred. Thus, the single-component self-curing polymer contains at least 1.0 methylol and/or alkoxy methyl group and at least 1.0 other reactive group of hydroxyl and/or carboxyl and/or amide group per polymer unit. Preferably, the self-curing, single-component polymer contains between 2 and 8 total reactive groups per polymer unit. The molecular weight of the final single component resin is between about 400 and 4000 and preferably between 800 and 2500. The methylol and/or alkoxy-methyl equivalent weight of the self-curing polymer can be between 200 and 2500 and preferably between 400 and 1500. The self-curing glycoluril polymer can be illustrated structurally as follows:

$$HO-R\left[-OCH_2-\underset{\underset{CH_2OR_1}{|}}{\overset{\overset{CH_2OR_1}{|}}{G}}-CH_2-O-R-\right]_m\left[-OCH_2-G\underset{CH_2OR_1}{\overset{CH_2OR_1}{<}}\right]_p(OH)_n$$

where,
R = Polyol minus hydroxyls
$R_1$ = H or $C_1-C_4$ alkyl
m = 0–2
n = 0–1
p = 0–1
2m + 3p = 1–4
mn + 1 = 1–4

Ratio $\frac{2m + 3p}{mn + 1}$ 0.5–2.0, preferably 0.8–1.2

Glycolurils are disclosed in U.S. Pat. No. 4,064,191 and are also known as acetylenediureas. Glycolurils are synthesized by reacting two moles of urea with one mole of glyoxal to provide a complex ring structure illustrated as follows:

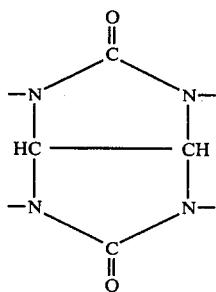

The foregoing glycoluril is referred to as "G" in the foregoing polymeric structures illustrating the self-curing glycoluril polymer in accordance with this invention. The preparation of various glycolurils are illustrated in U.S. Pat. No. 4,064,191 such as tetra-methylol glycoluril, tetrabutoxymethyl glycoluril, tetrabutoxymethyl glycoluril, partially methoylated glycoluril, tetra-methoxymethyl glycoluril, and dimethoxymethyl glycoluril. Useful glycoluril derivatives include for example, mono- and dimethylether of dimethylol glycoluril, the trimethylether of tetramethylol glycoluril, the tetramethylether of tetramethylol glycoluril, tetrakisethoxymethyl glycoluril tetrakisopropoxymethyl glycoluril, tetrakisbutoxymethyl glycoluril, tetrakisamyloxymethyl glycoluril, tetrakishexoxymethyl glycoluril and the like.

The polyfunctional reactive component for copolymerizing with the foregoing glycoluril to provide a single-component self-curing polymer is preferably a poly-hydroxy material such as a simple diol, triol, tetrol and similar simple polyols such as glycols, low molecular weight polyester diols, hydrogenated Bisphenol-A, and 1-4 cyclohexane dimethanol; and polymeric polyols such as polyester polyols, hydroxyl functional acrylics, styrene-allyl alcohols copolymers and similar hydroxy polymers. Generally, the polymers can be epoxy polymers, polyester polymer, acrylic polymers, phenolic polymers, vinyl polymers, and similar polymers, provided such polymers result in a final tack temperature above 75° C. for the final condensate to provide adequate storage stability and prevent caking. A tack temperature is the lowest temperature above which dry solid polymer particles tend to cake or block within a 60-second time period. The reactive hydroxyl, carboxyl, or amide component can contain reactive functional equivalent between about 2 and 6 reactive groups per molecular and preferably, 2 to 3 reactive groups per molecule. The molecular weight of the reactive functional component can be between 62 and 3000 preferably between 62 and 2000. The reactive hydroxyl component (carboxyl, amide) can be simple monomeric units or oligmeric units or low molecular weight polymeric units. Hydroxyl or carboxyl terminated polyester polymers can be produced by an esterification reaction of glycols together with saturated, unsaturated, aliphatic, or aromatic dicarboxylic acids such as phthalic, isophthalic, terephthalic, maleic, fumaric, succinic, adipic, azelaic, malonic and similar dicarboxylic acids. The preferred glycols are aliphatic glycols such as 1,3-butylene glycol or 1,4-butylene glycol; ethylene glycol and propylene glycols; neopentyl glycol as well as minor amounts of polyols such as trimethylol propane or ethane, or pentaerythritol. The glycols are reacted with the dicarboxylic acids at temperatures preferably above about 200° C. to substantially coreact all the available carboxylic acid to provide a hydroxyl polyester. Conversely, excess dicarboxylic acid is reacted completely with lesser equivalents of polyol to provide a carboxyl terminated polyester polymer. Vinyl and acrylic polymers produced from copolymerization of ethylenic monomers can contain reactive hydroxyl, carboxyl, or amide groups by copolymerizing minor amounts of functional ethylenic monomers such as acrylic or methacrylic acid for carboxyl groups, hydroxyethyl, or hydroxypropyl acrylate or similar hydroxy alkyl acrylates or methacrylates to provide for hydroxyl groups, and acrylamide or similar amides for amide groups. Epoxy and phenolic polymers can have reactive functional groups esterified or grafted onto the polymer chain to provide a reactive polymer.

The self-curing glycoluril copolymer contains at least 1 methylol and/or alkoxy methyl group and at least 1 hydroxyl (carboxyl, amide) group per copolymer unit molecule and preferably, in a 1 to 1 ratio. Thus, the copolymer contains at least two total coreactive groups but not more than 8 total coreactive groups per copolymer unit wherein at least one group is a methylol or alkoxy methyl and at least one group is a coreactive hydroxyl, carboxyl and/or amide group. The molecular weight of the self-curing polymer is between about 400 and 4000 and preferably, 200 to 2500. On a weight basis, the self-curing polymer contains between 8% and 70% glycoluril compound and the remaining being copolymerized component containing reactive hydroxyl, carboxyl, or amide groups. The combined methylol and/or alkoxy methyl equivalent weight can be between 150 and 5000 and preferably between 500 and 2000. The hydroxyl (carboxyl, amide) equivalent weight can be between 200 and 2500 and preferably between 400 and 1500.

In accordance with the process of this invention, the self-curing glycoluril copolymer can be synthesized in the presence of an acid catalyst by partial condensation of a tetra-methylol and/or tetra-alkoxy methyl with a hydroxyl, carboxyl, or amide containing polymer. The acid catalyst preferably is a strong acid catalyst such as a sulphonic acid and the reaction temperature can be between about 120° C. and 200° C. and preferably between about 140° C. and 180° C. The amount of acid catalyst added is based upon the amount of glycoluril compound and generally in the amount of 0.02 to 0.2 acid equivalents per 1000 grams of glycoluril compound. An amine buffer can be used in conjunction with the acid to properly control the reaction rate. Additional amine can be added to stabilize the resin toward the end of the reaction and during the discharge of the finished resinous polymer. The amount of organic amine can be in amounts equivalent to about 0 to 0.4 base equivalents per 1000 grams of glycoluril compound. A suitable equivalent ratio of base to acid in the reaction mixture can be between 1 to 2 equivalent parts base/acid to achieve polymer stability during discharge. At the desired end point, the removal of by-product alcohol can be terminated by stopping the distillation and then add additional amine to neutralize the acid catalyst and effectively prevent further polymerization. A versatile aspect of the process of this invention is that the alcohol portion of the starting alkoxy-methyl glycoluril compound can be displaced by a higher boiling alcohol which can be added to the reaction mixture along with the poly-hydroxy material. A higher boiling alcohol for instance, can displace the alkoxy group totally or partially and can be utilized to prevent gassing during the curing step which can result in pinholes in the cured film. Useful higher boiling alcohols for degassing are usually ring-type alcohols such as benzyl alcohol, benzoin and cyclohexanol. The type and the amount of alcohol can be determined relative to the tack temperature depressant effect such alcohol may have on the finished resin composition.

The self-cross-linking polymer can be thoroughly and uniformly mixed by mildly heating the solid materials with pigmentary solids, plasticizers, and other components to uniformly blend the components. Pigments can ordinarily include opacifying pigments such as titanium dioxide, zinc oxide, leaded zinc oxide, titanium calcium, as well as tinting pigment such as carbon black, yellow oxides, brown oxides, tan oxides, raw and burnt sienna or umber, chromium oxide green, pthalocyanine green, phthalonitrile blue, ultra-marine blue, cadmium pigments, chromium pigments, and the like. Filler pigments such as clay, silica, talc, mica, wollastonite, wood flour and the like can be added. The raw batch ingredients can be thoroughly premixed in a high intensity mixer such as a high speed dry blender whereby the materials are discharged in a uniform mixture. The high intensity mixer discharges the batch components to a heated screw extruder wherein the extruder is internally heated by an indirect heating fluid such as steam, hot water, or synthetic oil whereupon the exit extruder temperature is regulated according to the type of powder paint being produced but generally is between about 90° C. and 150° C. at the heated exit die of the screw fed extruder. The extrudate emerges from the extruder as a rope which is chilled and squeezed to a thin ribbon by cooling rolls then passes onto a water cooled stainless steel conveyor belt whereby the plastic ribbon extrudate fully hardens. The cooled extrudate then passes through a mechanical comminutor disposed at the end of the cooled stainless steel belt to efficiently break the fragile brittle ribbon into very small flakes. The small flakes are then discharged into a cooled mill, such as a hammer mill, to grind the small particles into powder paint of less than 325 mesh and preferably passing a 200 mesh U.S. Standard Sieve Screen whereupon the powder can be further classified into particle size if desired. The resulting powder coatings advantageously exhibit a tack temperature well above 70° C. whereby the dry powder does not cake or block, can be easily spray applied, and fused with moderate heat to provide a thermoset continuous surface coating.

The powder paints in accordance with this invention can be applied to a steel panel substrate and moderately heated between temperatures of about 140° C. and 205° C. for 5 to 30 minutes to obtain desirable flow out and cure. The advantages of this invention are further illustrated in the following examples.

EXAMPLES

Self-Curable Prepolymer 1

Into a reaction vessel equipped with stirrer, thermometer, nitrogen sparge inlet and fractionating column was charged 1151 grams neopentyl glycol, 1448 grams terephthalic acid and 0.9 grams butyl stannoic acid as esterification catalyst. This polyester diol was processed by the usual condensation polymerization technique to an acid no. of 4 mg. KOH per gram. It had a tack temperature of 54° C., a hydroxyl content of 3.3% and a (Calc.) molecular weight of 909. The batch was cooled to 140° C. and to it was added 425 grams tetramethoxymethyl glycoluril. A total of 5.7 gm. PC200 and 6.0 gm. Quadrol were used to control the reaction rate. A strong nitrogen sparge was used throughout the condensation.

The final product had a tack temperature of 85° C., a viscosity at 50% in meta-pyrol of $Z_1$–$Z_2$ and a methoxy equivalent weight (MEW) of 1260. Applied to phosphate-treated 24 gauge steel as a clear 1.0 mil coating and baked at 350° F. for 20 minutes, it demonstrated a methyl ether ketone rub resistance of greater than 200 rubs, a pencil hardness of H and perfect flexibility around a conical mandrel.

Self-Curable Prepolymer 2

515 grams of the polyester diol of Example 1, 22 grams benzyl alcohol and 85 grams TMMGU were processed similarly to Example 1. A total of 1.3 grams PC200 (0.007 equiv.) and 1.3 grams Quadrol (0.009 equiv.) were used to control reaction rate in a way similar to Example 1. The final product had a tack temperature of 85° C. and a 50% NV viscosity in meta-pyrol of $Z_3$.

Self-Curable Prepolymer 3

Into a reaction flask equipped as in Example 1 but without the fractionating column was charged 240 grams hydrogenated bisphenol-A and 170 grams TMMGU. A strong nitrogen sparge and a temperature of 155° C. were maintained throughout the polymerization. A total of 1.8 gm. PC200 and 2.2 gm. Quadrol were added. The final product had a tack temperature of 84° C. and a viscosity at 50% NV in meta-pyrol of L. With additional PC200 and Quadrol, it cured to a very hard, brittle film with greater than 200 MEK solvent rubs when baked 177° C. for 20 minutes.

Self-Curable Prepolymer 4

To a reaction vessel equipped as in Example 1 were charged 3348 grams neopentyl glycol, 4580 grams terephthalic acid and 3.0 grams butyl stannoic acid. This hydroxyl-capped polyester was processed by usual condensation techniques to an acid no. of 2.7. It had a tack temperature of 70° C., a hydroxyl content of 2.34% (calc.) and a molecular weight (calc.) of 1450. To this was added, at 150° C., 782 grams TMMgU. Additions of PC200 and Quadrol were begun. A total of 7 gm. PC200 and 10 gm. Quadrol were added to control reaction rate. The final resin had a tack temperature of 80° C., a viscosity at 50% in meta-pyrol of V-W and a methoxy equivalent weight (MEW) of 1450. The distillate (150 grams) contained, by GC analysis, 111 grams methanol and no formaldehyde, indicating a clean methoxyhydroxyl reaction.

A clear film of the resin, baked at 177° C./20 minutes, had excellent gloss, H pencil hardness, 200+ MEK rubs and passed an indirect impact test of 160 inch-pounds.

To illustrate some additional advantages of the self-curing prepolymers of the present invention over the TMMGU/Resin blends as described by U.S. Pat. No. 4,118,437, the following data (Table I) is presented.

TABLE I

Prepolymers vs. Blend

| | Example 4 | Resin Blend* VPE802/TMMGU (9/1) |
|---|---|---|
| Tack Temp °C. | 80 | 78 |
| Viscosity (50% Meta-pyrol) | V-W | V-W |
| Caking Resistance | Good | Poor |
| Free TMMGU (by boiling water extraction) | 3.0% | 9.5% |
| Theoretical methanol evolved by curing | 2.2% | 3.8% |

*The resin blend is a 9/1 weight ratio of VPE5802/TMMGU. VPE5802 is a hydroxylfunctional polyester supplied by Goodyear. It has an acid no. of 12-13 mg. KOH per gram, a hydroxyl content of 1.75%, a tack temperature of 84° C., and a viscosity at 50% non-volatile in meta-pyrol of X-Y.

I claim:

1. A one-component thermosetting powder coating composition having a tack temperature above 70° C. and adapted to be applied to a substrate and heat fused into a cross-linked thermoset surface coating, said powder coating containing a thermosetting binder comprising:
   a self-curing glycoluril copolymer having between 0.5 and 2 equivalents of reactive alkoxy methyl or methylol groups per 1 equivalent coreactive hydroxyl, carboxyl, or amide groups adapted to cross-link with said alkoxy methyl or methylol groups, said copolymer having a molecular weight between 400 and 4000, an alkoxy methyl or methylol equivalent weight between 200 and 2500, and a coreactive hydroxyl, carboxyl or amide equivalent weight between 200 and 2500, said glycoluril copolymer containing between 8% and 70% by weight tetramethylol glycoluril and/or tetramethyl glycoluril copolymerized with a poly-functional component selected from a polyol, diacid, or a diamide to provide a self-cross-linking copolymer upon exposure to heat.

2. The one-component powder paint in claim 1 wherein the self-curing glycoluril copolymer has a molecular weight between 800 and 2500.

3. The one-component powder paint in claim 1 wherein the self-curing glycoluril copolymer has a methylol or alkoxy-methyl equivalent weight between 400 and 1500.

4. The one-component powder paint in claim 1 wherein the total ratio of equivalents of tetra-methylol and/or tetra-alkoxy groups on said copolymer to reactive hydroxyl, carboxyl, and/or amide groups on said polymer is between 0.8 and 1.2

5. The one-component powder paint in claim 1 wherein the self-curing copolymer contains between 2 and 8 total reactive groups per copolymer unit provided at least one reactive group is a methylol or alkoxyl methyl and at least one reactive group is a hydroxyl, a carboxyl, or an amide group.

6. In a process for producing a one-component thermosetting powder paint composition having a tack temperature greater than 70° C. and adapted to be aplied to a substrate and heat fused into a crosslinked surface coating, the improvement in the process comprising:
   providing a self-curing glycoluril copolymer comprising by weight between 8% and 70% glycoluril and having a molecular weight between 400 and 4000 by coreacting a tetra-methylol or tetra-alkoxy methyl glycoluril with a reactive material containing reactive hydroxyl, carboxyl, or amide groups by partial condensation to provide a self-curing glycoluril copolymer having between 0.5 and 2 equivalents of reactive alkoxy methyl or methylol groups per 1 equivalent of reactive hydroxyl, carboxyl, or amide group.

7. The process in claim 6 wherein the partial condensation reaction is at temperatures between about 120° C. and 200° C.

8. The process in claim 6 wherein between about 0.02 and 0.2 acid gram equivalents of sulfonic acid or other strong acid catalyst per 1000 grams of glycoluril are added to the reaction mixture as a partial condensation catalyst.

9. The process in claim 6 wherein up to about 0.4 equivalents of an amine buffer are added to the reaction mixture as a stabilizer.

* * * * *